United States Patent [19]

Anderson, deceased et al.

[11] 4,051,324

[45] Sept. 27, 1977

[54] RADIATION RESISTANT CABLE AND METHOD OF MAKING SAME

[75] Inventors: Robert W. Anderson, deceased, late of Burlington, Vt., by Dorothy M. Anderson, executrix; Robert E. Smith, Jr., Burlington, Vt.

[73] Assignee: Haveg Industries, Inc., Wilmington, Del.

[21] Appl. No.: 576,522

[22] Filed: May 12, 1975

[51] Int. Cl.² ............................................. H01B 7/00
[52] U.S. Cl. ........................... 174/121 R; 156/53; 156/56; 174/121 A; 174/121 SR
[58] Field of Search ........ 174/121 R, 110 FC, 120 R, 174/121 SR, 121 A; 156/53, 56

[56] References Cited

U.S. PATENT DOCUMENTS

| 2,015,714 | 10/1935 | Delmar | 174/121 R |
| 2,182,668 | 12/1939 | Kaimer | 156/56 |
| 2,459,653 | 1/1949 | Keyes | 174/121 R |
| 2,691,694 | 10/1954 | Young | 174/110 FC |
| 3,303,270 | 2/1967 | Shelton | 174/121 R |
| 3,378,628 | 4/1968 | Garner | 174/120 R |
| 3,408,453 | 10/1968 | Shelton | 174/120 SR |

*Primary Examiner*—E. A. Goldberg
*Attorney, Agent, or Firm*—Stanley A. Becker

[57] ABSTRACT

A radiation resistant cable is made by wrapping a barrier film over a conductor and covering it with a silicone saturated asbestos covering. The asbestos is passed through one or more dies to compact the asbestos covering and accurately size it. One or more layers of polyimide tape is wrapped about the asbestos. The polyimide tape is covered by a heat-sealable tape over which a fiberglass cover is braided. The cable is then heated to seal the heat-sealable tape to itself as well as to the adjacent layers. The cable is then passed through a coating bath to impregnate and saturate the fiberglass braid, following which the cable is heated to extract the solvent in the coating solution.

5 Claims, 1 Drawing Figure

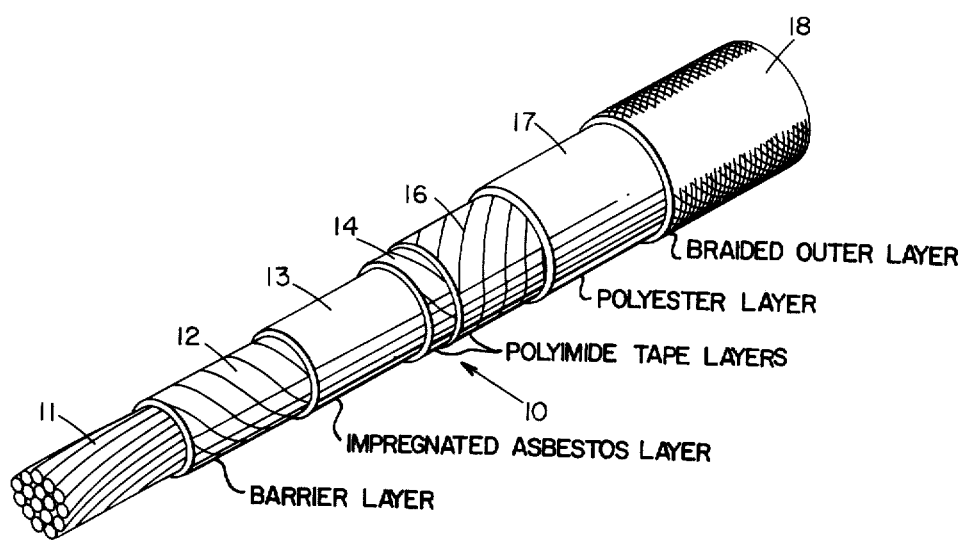

RADIATION RESISTANT CABLE AND METHOD OF MAKING SAME

BACKGROUND OF THE INVENTION

This invention relates to an electrical cable and a method of making the cable, and particularly to a radiation resistant electrical cable also having high temperature resistance, insulation resistance, moisture resistance, abrasion resistance and high dielectric strength.

Heretofore, cables which offered resistance to nuclear radiation were very bulky and large due to relatively large quantities of radiation resistant material, such as carded asbestos, being incorporated therein. Not only were relatively large diameters necessary to meet required specifications, but also, such cables were incapable of meeting close dimensional tolerances. Additionally, such cables did not have a combination of high radiation resistance with high insulation resistance, moisture resistance, high dielectric strength and abrasion resistance.

The present invention is directed to a cable and a method for making same for overcoming the foregoing problems.

SUMMARY OF THE INVENTION

The subject invention includes a wire conductor which is covered by a barrier film, such as a polyester film. One or more layers of asbestos dipped in a saturant such as silicone to compact the asbestos and hold the asbestos fibers together to eliminate particles of asbestos and avoid any safety hazard is wound about the barrier film. The asbestos wrapped wire is subsequently passed through a rotating sizing die to compact the asbestos and form a relatively thin but dense asbestos layer which provides radiation resistance as well as high temperature resistance, and to maintain desired dimensional tolerances. One or more layers of a polyimide tape is wound about the asbestos layer to provide radiation resistance and the desired dielectric strength. A moisture resistant layer is then provided on the polyimide tapes to provide a moisture barrier. The outer layer is an impregnated fiberglass braid to provide mechanical protection against abrasion. The resulting cable has superior radiation resistance, excellent high temperature resistance, moisture resistance, good dielectric strength, is flameproof, and has high abrasion resistance.

Other advantages of the present invention will be apparent from the following detailed description when considered in conjunction with the following detailed drawing, which drawing forms a part of the specification. The drawing illustrates only a typical embodiment of the invention and is therefore not to be considered limiting of its scope for the invention may admit to other equally effective embodiments.

BRIEF DESCRIPTION OF THE DRAWING

The drawing shows a portion of a cable in accordance with the principles of this invention having the individual layers cut away for purposes of illustration.

DESCRIPTION OF THE INVENTION

Referring to the drawing, there is shown a cable generally designated as 10 having an inner wire conductor 11 which typically may be copper, tin clad copper, copper alloy, or the like. Covering the conductor 11 is a barrier film 12 which prevents any asbestos fibers from being forced into the strands of the conductor 11. The film 12 typically is a polyester film, but also may be polyimide, paper, or the like. One or more layers of asbestos roving 13 saturated with material such as solvent thinned silicone or polyimides or any other material which bonds and compacts the asbestos fibers is wound over the barrier film 12 to provide radiation resistance and high temperature resistance. On small gauge cables, for example, 6-16 AWG, it may be desirable to card the asbestos onto the barrier film covered conductor using conventional carding machines. In such instances, the asbestos covered conductor is saturated with solvent thinned silicone or polyimides after the asbestos is applied around the conductor. While the description of the invention herein refers to silicone saturation or impregnation, it is to be understood that polyimides or other suitable materials may also be used in place of silicone. The silicone saturation is provided to bond and compact the asbestos fibers and to eliminate loose particles of asbestos that come free during handling, and thus avoid any safety hazards that result from the use of asbestos. The asbestos covered conductor is then subsequently passed through a rotating sizing die which compacts and polishes the asbestos layer and maintains close dimensional tolerances and reduced diameters of the cable. The cable is then dip coated by passing it through a tank of silicone saturant to further compact the asbestos. After saturation, the cable passes through another rotating sizing die to further smooth the cable and control the finished outside diameter of the cable. The cable is then passed through a hot air oven to cure the saturants and extract the solvent thinner.

A first layer of polyimide tape 14 is wound over the asbestos layer 13. A second layer of polyimide tape 15 may also be wound over the first layer 14. The polyimide tape improves the dielectric strength of the cable with relatively small increase in thickness. Additionally, the polyimide layers also provide radiation resistance as well as improving mechanical toughness. The thickness of the polyimide tape layers is selected to provide the desired dielectric strength of the cable. A heat sealable polyester film 17 is wound on the outer polyimide tape layer 16. An outer layer 18 of fiberglass braid is applied to provide additional radiation resistance and also mechanical protection against abrasion. Then the cable is subjected to an elevated temperature sufficient to seal the polyester film 17 to provide the required moisture barrier. When subjected to heating, the polyester film 17 seals to itself and adjacent layers and provides a moisture impervious barrier. Then the cable is passed through a bath of solvent thinned silicone or polyimide solution to impregnate the braid 18 and provide additional mechanical toughness and abrasion resistance. The cable is then heated to extract the solvent thinner.

A more detailed description of the method for making the cable follows. The conductor 11 is advanced in an in-line operation through a conventional winding machine which wraps a barrier film 12 about the conductor in overlapping relationship. Asbestos roving is prepared for application by presoaking it in a tank of silicone saturant such as Dow Corning Silicone 996 or General Electric Silicone SR-224. The silicone saturant is mixed with a solvent thinner such as cellusolve acetate. After soaking, the asbestos roving is air dried to a drip dry condition and then immediately wound on the barrier film 12. One or more layers of asbestos roving or carding is applied to attain the desired outside dimension of the asbestos 13. The asbestos insulated conductor is then passed through a rotating sizing die having an orifice slightly smaller than the outside diameter of the asbestos insulated conductor. The rotating die is used to smooth and compact the asbestos 13. The asbestos coated wire is then passed through a tank filled with silicone saturant, again either Dow Corning Silicone 996 or General Electric Silicone SR-224, which is thinned with cellusolve acetate or any other suitable thinner. After saturation, the asbestos coated conductor is passed through a rotating die which is used to further smooth the wire and provide the desired outside diameter. Then the coated wire is heated to cure the saturants and extract the cellusolve acetate thinner.

Following curing, one or more layers 14 and 16 of polyimide tape, such as DuPont's Kapton H, is wound about the asbestos coating 13. If at least two layers of polyimide tape are used, one layer is typically wound in one direction and the other is wound in the opposite direction. Next, a layer of polyester tape 17 which is heat-sealable on one side, is wound sealable side down in an overlapping configuration. Typically, a heat-sealable polyester tape has a polyvinyl chloride coating on each side thereof which melts upon application of heat so that the polyester tape 17 bonds to itself as well as to adjacent layers 16 and 18. Next, a fiberglass layer 18 is braided over the polyester film 17, using conventional braiding facilities. The cable is then heated to seal the heat-sealable polyester film 17. Subsequently, the cable is dip-coated by passing it into a thinned solution of silicone such as, for example, General Electric Silicone SR-224 and cellusolve acetate. The purpose of the dip-coating is to impregnate the braid 18 to provide abrasion resistance and mechanical strength. The cable is subsequently heated by passing it through a hot air oven to extract the cellusolve acetate.

The subject invention is exemplified by the following example:

EXAMPLE

A 12-gauge (AWG) cable was manufactured by wrapping a stranded tin plated copper wire manufactured to ASTM B-3, ASTM B-33 and ASTM B-8 specifications, having a 0.0925 inch O.D. with a layer of unsealable polyester (Mylar) tape 0.001 inch thick (nom.) using a 33% minimum overlap. An insulation of AAA carded asbestos was then applied and the asbestos coated wire was passed into a coating bath having a 50/50 mixture of Dow Corning Silicone 996 and cellusolve acetate. The asbestos coated wire was then polished and compacted by passing it through a rotating die and then sized and further compacted by passing it through another rotating die. The asbestos coated wire was then cured by passing it through a 3-zone hot air oven at temperatures of 250° F. in zone 1, 350° F. in zone 2, and 530° F. in zone 3, at a conductor speed of 13 feet per minute. The asbestos coated wire was then wrapped with DuPont's Kapton H tape 0.001 inch thick in a right hand overlay with 51% minimum overlap. A second layer of DuPont's Kapton H tape 0.001 inch thick was then wrapped about the first layer in a left hand overlap with a 51% minimum overlap. Then a heat-sealable 0.001 inch thick Mylar tape was wrapped in a right hand overlay with 51% minimum overlap over the second Kapton H tape. A fiberglass braid having a designation 150 1/0 ECG was braided at a 35° minimum angle over the Mylar tape. The cable then passed into a hot air oven at sufficient temperatures to seal the Mylar about itself and to the Kapton H layer and the braid. The cable was then passed through a saturating solution consisting of one part General Electric Silicone SR-224 and two parts cellusolve acetate. Then the cable was passed through a 3-zone hot air oven with heat settings of 250° F. for zone 1, 350° F. for zone 2, and 530° F. for zone 3 at a wire speed of 13 feet per minute. The finished cable had an O.D. of between 0.130 and 0.142 inch and a weight of 28 pounds per thousand feet maximum. The estimated insulation resistance was 100,000 ohms. per thousand square feet minimum. An abrasion resistance test in accordance with MIL. T. 5438 was performed with the result that the cable withstood 30 inches of tape travel minimum. The estimated radiation resistance for the cable is 250 megarads minimum. The cable withstands a flame test of at least 5 minutes at 2000° F.

It is to be understood that the above described embodiment is merely illustrative of applications of the principles of this invention and that numerous other arrangements and modifications may be made within the spirit and scope of the invention.

What we claim and desire to protect by Letters Patent is:

1. An electrical cable comprising:
   an inner conductor;
   a first barrier layer on said conductor;
   a compacted asbestos layer impregnated with a saturant on said barrier layer to provide high temperature and radiation resistance;
   at least one layer of polyimide tape over said asbestos layer to provide high dielectric strength;
   a layer of heat-sealable polyester sealed about said polyimide tape layer to provide a moisture impervious barrier; and
   a braided filamentary outer layer to provide protection against abrasion, said braided outer layer sealed to said heat-sealable polyester layer.

2. An electrical cable as set forth in claim 1 wherein said compacted asbestos layer is a compacted asbestos roving saturated with a silicone saturant.

3. An electrical cable as set forth in claim 1 wherein said first barrier layer is a polyester material, at least two layers of polyimide tape are wrapped about said asbestos layer in opposite directions, and said braided outer layer is impregnated fiberglass.

4. A method of making an electrical cable comprising:
   advancing an electrical conductor;
   wrapping a barrier film about said advancing conductor;
   applying an impregnated asbestos covering to said barrier film;
   compacting said asbestos covering to decrease the outer diameter and make it more dense;
   wrapping at least one layer of polyimide tape over said asbestos layer;
   wrapping a heat-sealable polyester layer in overlapping relationship about said polyimide tape layer;
   applying a braided filamentary layer on said heat-sealable layer; and
   applying sufficient heat to seal said polyester layer to itself and to the adjacent polyimide tape layer and braided filamentary layer.

5. A method of making an electrical cable as set forth in claim 4 wherein said impregnated asbestos covering is a silicone saturated asbestos roving that is wrapped about said barrier film in one or more layers.

* * * * *